US012320078B2

(12) United States Patent
Pardue

(10) Patent No.: US 12,320,078 B2
(45) Date of Patent: Jun. 3, 2025

(54) ATRICULATING SCREED FRAMEWORK

(71) Applicant: Darren Scott Pardue, Ada, OK (US)

(72) Inventor: Darren Scott Pardue, Ada, OK (US)

( * ) Notice: Subject to any disclaimer, the term of this patent is extended or adjusted under 35 U.S.C. 154(b) by 677 days.

(21) Appl. No.: 17/803,292

(22) Filed: Apr. 26, 2022

(65) Prior Publication Data

US 2023/0340735 A1 Oct. 26, 2023

(51) Int. Cl.

*E01C 19/44* (2006.01)
*B25G 1/06* (2006.01)
*E04F 21/24* (2006.01)

(52) U.S. Cl.

CPC ................ *E01C 19/44* (2013.01); *B25G 1/06* (2013.01); *E04F 21/241* (2013.01)

(58) Field of Classification Search

CPC ........... E01C 19/44; E04F 21/241; B25G 1/06
USPC .......................................................... 404/118
See application file for complete search history.

(56) References Cited

U.S. PATENT DOCUMENTS 2,606,050 A 8/1952 Morris
2,710,571 A 6/1955 Pfister
2,897,736 A 8/1959 Alessio
3,046,856 A * 7/1962 Baxter .................... E01C 19/44 404/118
3,574,380 A 4/1971 Tague
4,449,845 A 5/1984 Carillo
4,828,427 A 5/1989 Nisenbaum
4,962,561 A 10/1990 Hamilton
5,156,429 A 10/1992 ADams
5,771,536 A 6/1998 Blessing
5,980,154 A * 11/1999 Record ................... E04F 21/04 404/97
6,082,795 A 7/2000 Fornelli
6,981,819 B1 * 1/2006 Suckow ................ E01C 19/006 404/114
7,131,255 B1 11/2006 Caneba
7,293,938 B1 * 11/2007 Suckow ................ E04F 21/244 404/114
7,464,441 B2 * 12/2008 Peach ....................... B62B 1/18 298/3
7,491,013 B2 2/2009 Bohse
8,016,517 B1 9/2011 Pardue
2018/0106057 A1 * 4/2018 Wheatley ................ E04G 21/10

FOREIGN PATENT DOCUMENTS

CA 2569148 A1 * 5/2008 ............. E01C 19/44
FR 2810355 A3 * 12/2001 ............... B25G 1/06
FR 2878878 A1 * 6/2006 ............ E04F 21/241

* cited by examiner

*Primary Examiner* — Raymond W Addie
(74) *Attorney, Agent, or Firm* — Randal D. Homburg

(57) ABSTRACT

A pair of articulating screed framework extensions, independently adjustable at least two locations along each extension, independently adjusting each extension to a comfortable working height and other subjective needs of each user, each extension providing an upper plate on a first section, a hand grip on a second section and distal end on a third section to which a screed workpiece is independently attached to locate a width between each extension, with a locking pivot joint between each first and second section and each second and third section.

4 Claims, 10 Drawing Sheets

ATRICULATING SCREED FRAMEWORK

CROSS REFERENCE TO RELATED APPLICATIONS

None.

I. BACKGROUND OF THE INVENTION

1. Field of Invention

A pair of articulating screed framework extensions, independently adjustable at least two locations along each extension, independently adjusting each extension to a comfortable working height and other subjective needs of each user, each extension providing an upper plate on a first section, a hand grip on a second section and distal end on a third section to which a screed workpiece is independently attached to locate a width between each extension, with a locking pivot joint between each first and second section and each second and third section.

2. Description of Prior Art

A preliminary review of prior art patents was conducted by the applicant which reveal prior art patents in a similar field or having similar use. However, the prior art inventions do not disclose the same or similar elements as the present pair of screed handles, nor do they present the material components in a manner contemplated or anticipated in the prior art.

In U.S. Pat. No. 7,491,013 to Bohse, a handle attachment is indicated which provides alternate grip sites on an otherwise simple elongated handle. U.S. Pat. No. 5,980,154 to Record show a pair of screed handles connected together with intermediary grip handles and upper cuff handles steadied against the forearms of the user while surfacing concrete to provide a more stable screed apparatus.

A multiple contoured handle apparatus to be applied to conventional tools is indicated in U.S. Pat. No. 5,771,535 to Blessing, with FIG. 15 showing a handle bent along a three dimensional axis, but not in the same manner or serving the same ergonomic function as the present paired screed handles. A pivotal axis handle is demonstrated in U.S. Pat. No. 4,828,427 to Nisenbaum. Two different adjustable screed frame members are indicated in U.S. Pat. No. 4,449,845 to Carrillo and U.S. Pat. No. 2,897,735 to Alessio, both of them having a belt to anchor the device to the operator while the screed is being used.

In U.S. Pat. No. 8,061,517 to Pardue, an ergonomic concrete scree handle is disclosed providing a similar functional framework, but lacks the adjustability of the present set of creed handles allowing angular adjustment for each subjective user at two locations along each handle, adapting the handle to various user heights and arm lengths, as well as variable upper body strength. It also applies varying distance between each handle provided by the desired attachment to the workpiece applied to the distal ends of each screed handle.

II. SUMMARY OF THE INVENTION

A concrete screed device has been used in the concrete finishing process most likely since the advent of concrete itself. The least sophisticated of these screed is a simple flat board which is drawn on the surface of the concrete to provide the concrete with a smooth and level surface. Over time, most likely due to wear and tear on the backs of the people performing the concrete finishing being bent over while using a simple flat board, these board started to have handles or extensions attached to the boards to allow the operator to stand in an upright position while keeping the board level and consistent over the surface of the concrete. Most of the advances in concrete screed have been directed towards stabilization of the screed while somewhat providing less stress on the operator.

The present concrete screed extension handles are provided in pairs, each directed to opposing arms of the operator, while formed in a mirror image of one another. Each of the pair of handles has an upper section defining an arm plate extension directed inward, an intermediate section defining a hand grip also directed inward, and a lower section having a lower end terminating into a screed clamp, which is generally a section of board connecting between and intermediary section, a lower end attached to the screed board of the operator's choosing. Between each upper and intermediary section is an articulating joint which may be adjusted and secured to a desired angle. A similar articulating joint is located between the intermediary section and the lower section, allowing a custom configuration of each screed extension handle based on the comfortable working position of the user.

The arm plate extensions and orientation provide each handle to incur a downward force when the hand grips are forced downward using the leverage against the forearm, and an upward force distributed along the hand and lower forearm near the wrist to lift the screed, providing the operator with more finesse and control over the screed during the finishing process with a reduced amount of stress to the operators back and legs and without having to alter the operator's grip in the concrete finishing process.

III. DESCRIPTION OF THE DRAWINGS

The following drawings are submitted with this utility patent application.

IV. DESCRIPTION OF THE PREFERRED EMBODIMENT

Figure 1:
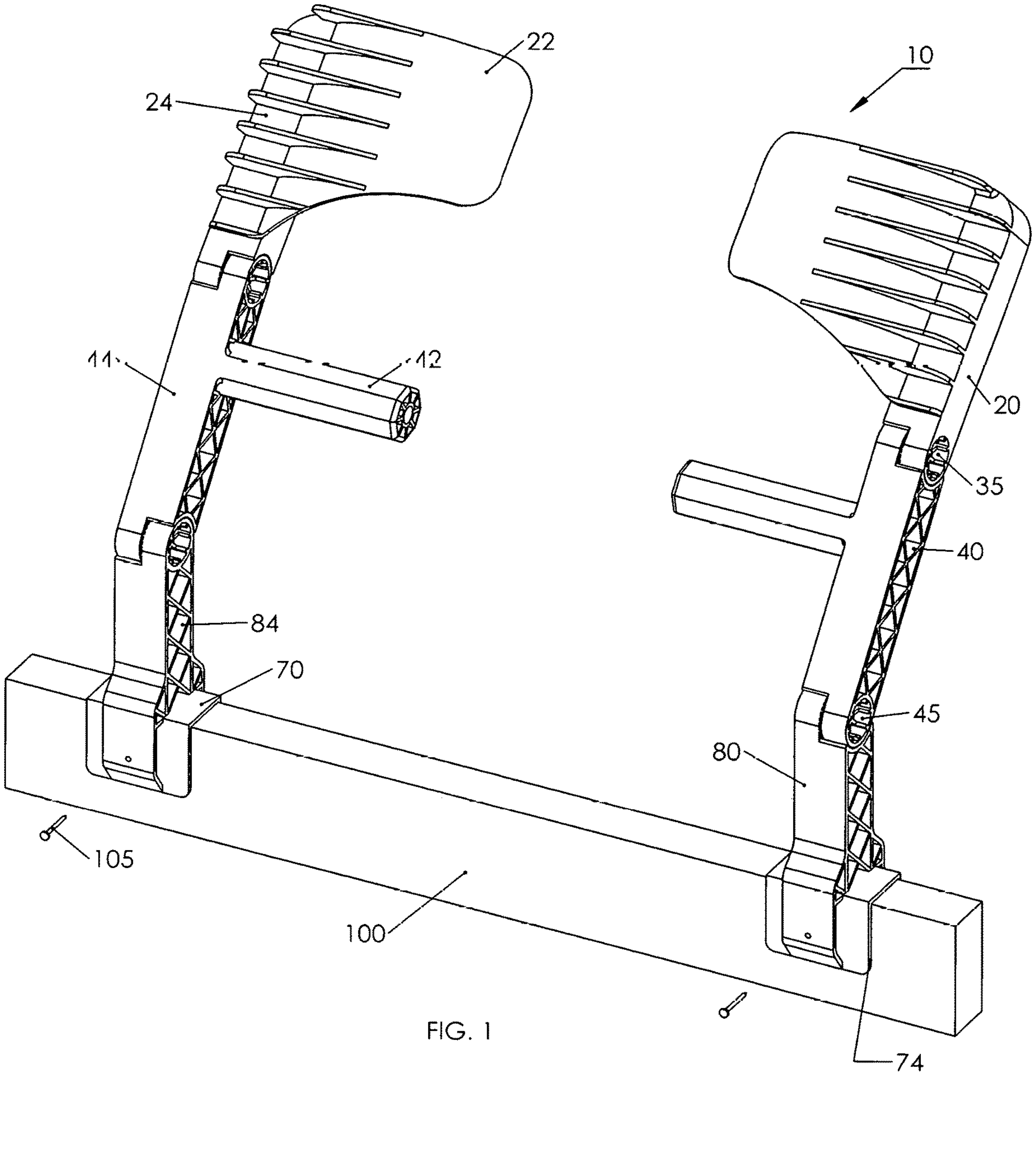
FIG. 1 is a front perspective view of the concrete screed extension handles with phantom lines showing the lower screed endpiece.
Figure 2:
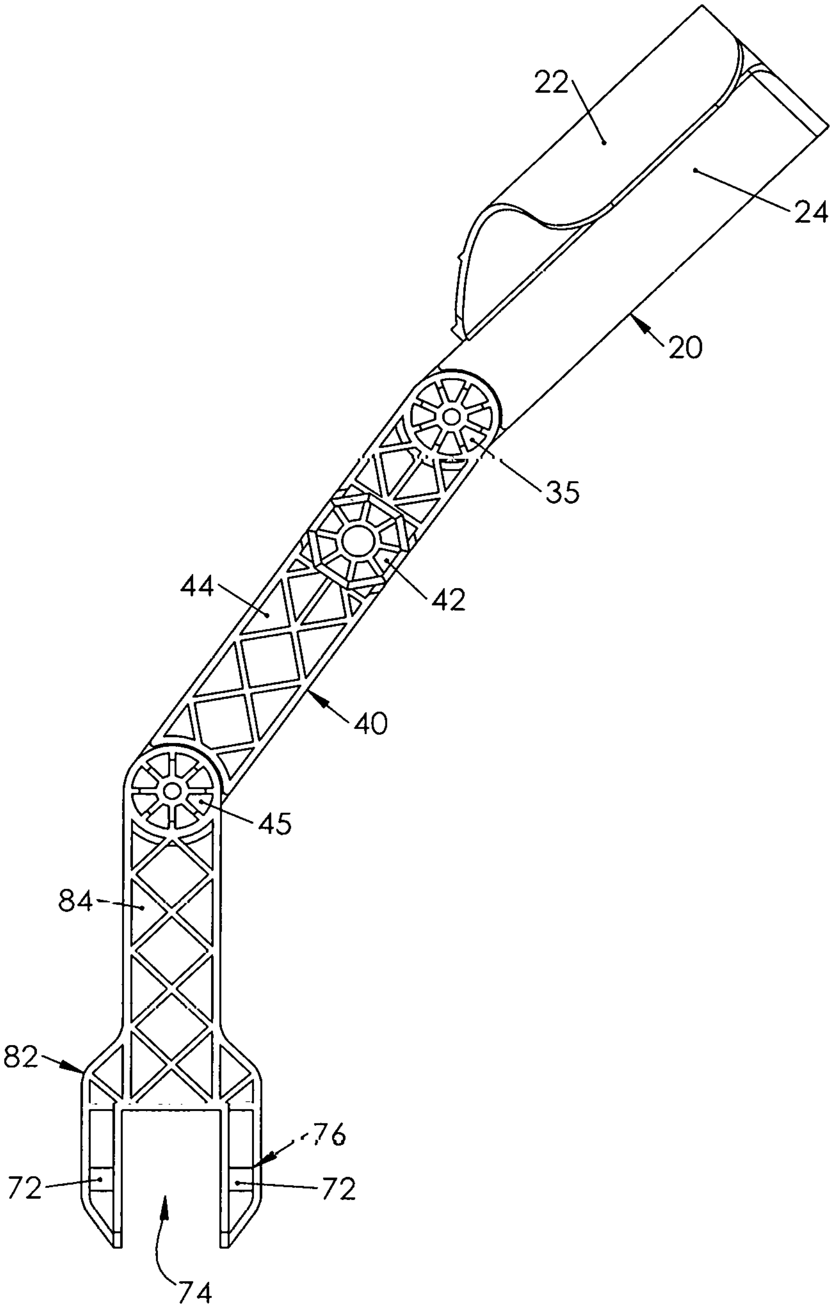
FIG. 2 is an inner side view of a screed extension handle.
Figure 3:
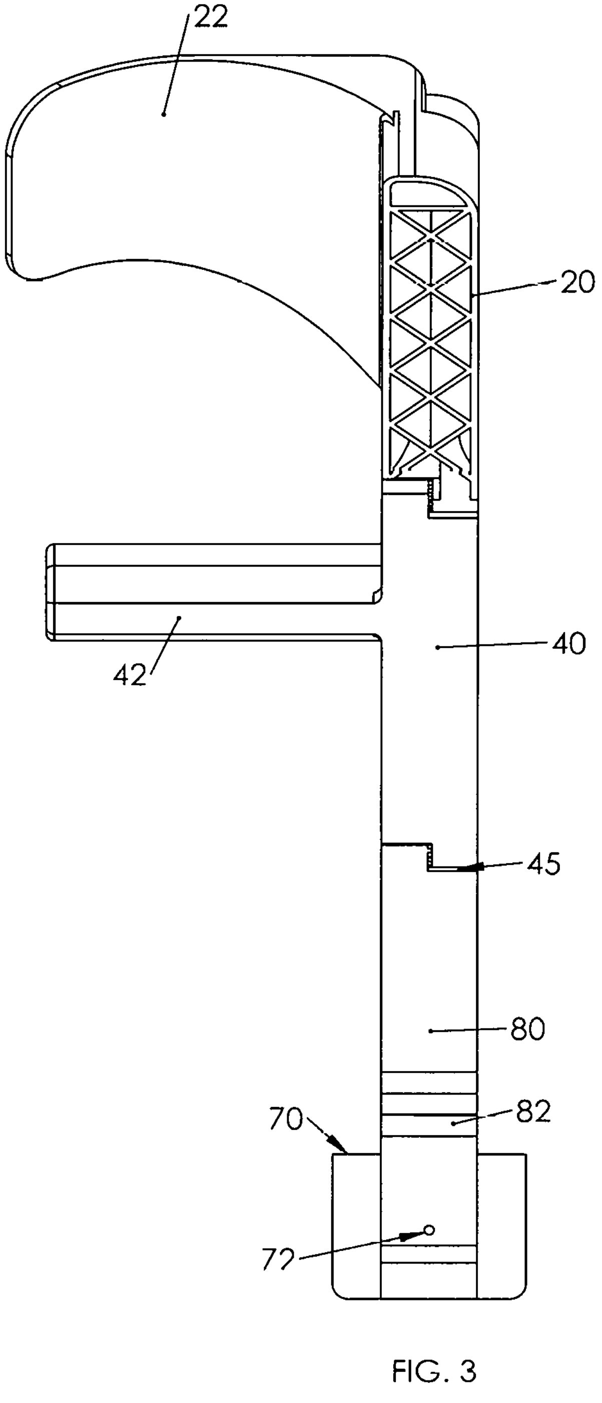
FIG. 3 is a rear view of the screed extension handle.
Figure 4:
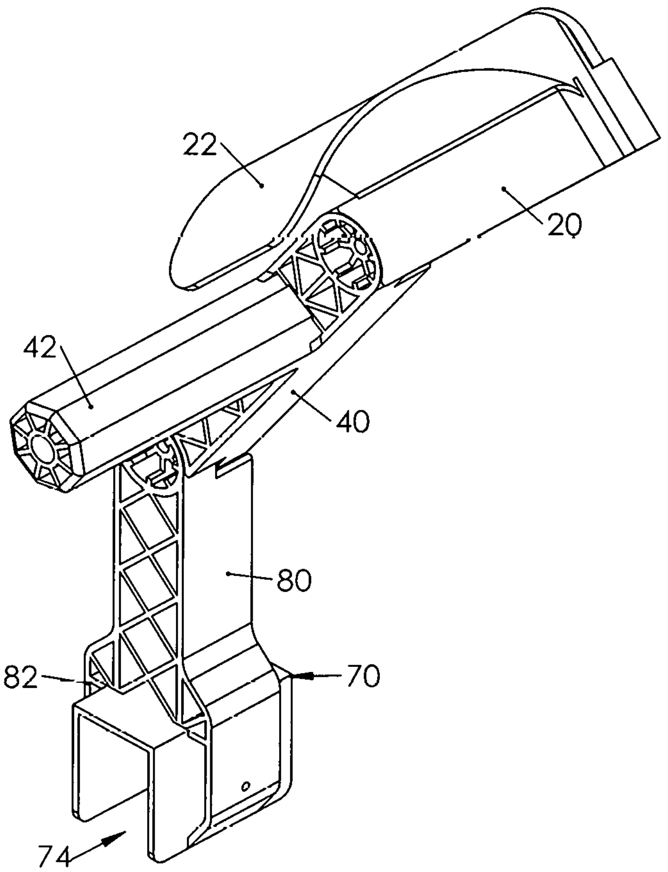
FIG. 4 is an inner perspective view of the screed extension handle.
Figure 5:
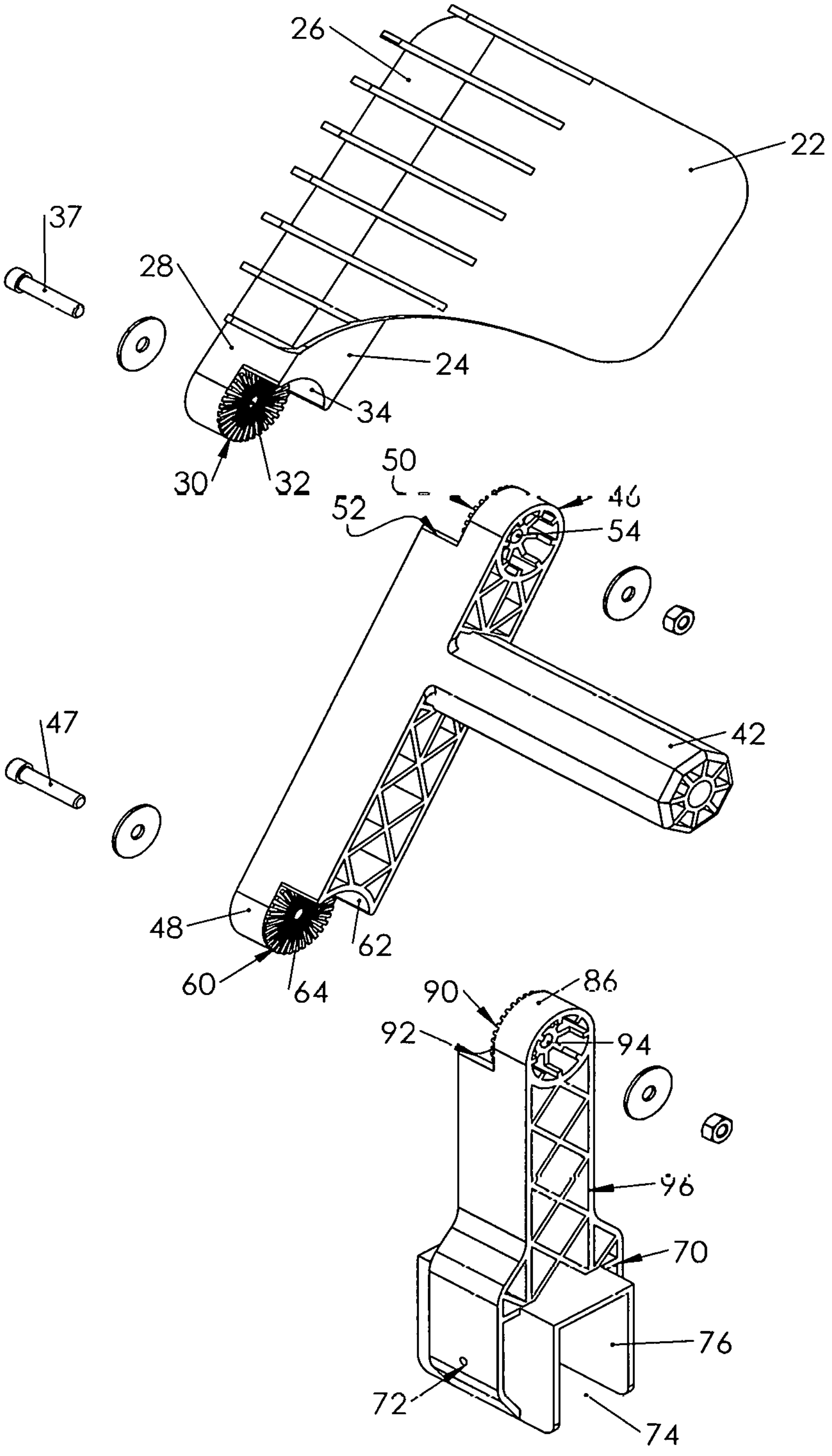
FIG. 5 is an exploded perspective view of the screed extension handle.
Figure 6:
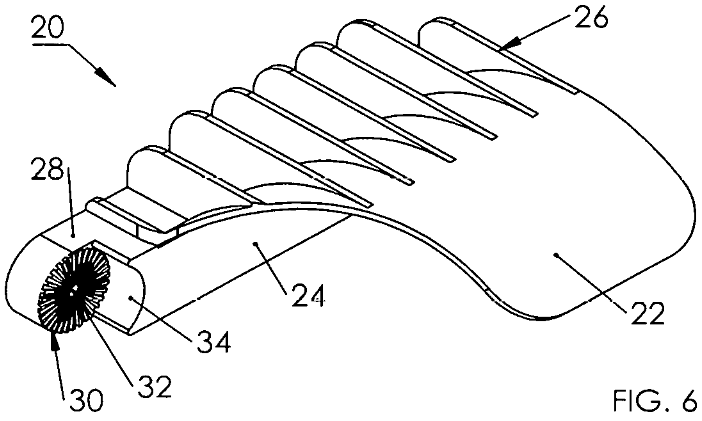
FIG. 6 is an upper perspective view of the upper section.
Figure 7:
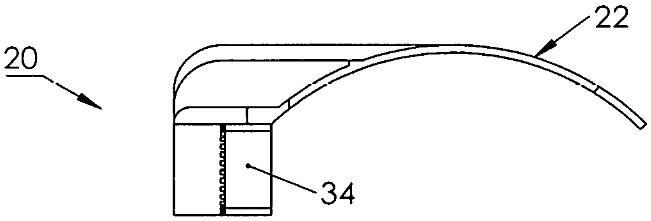
FIG. 7 is an end view of the upper section.
Figure 8:
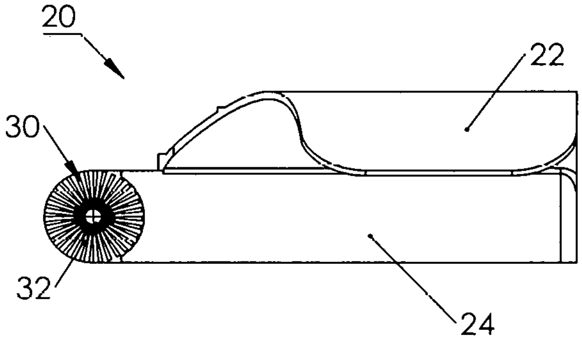
FIG. 8 is an inner side view of the upper section.
Figure 9:
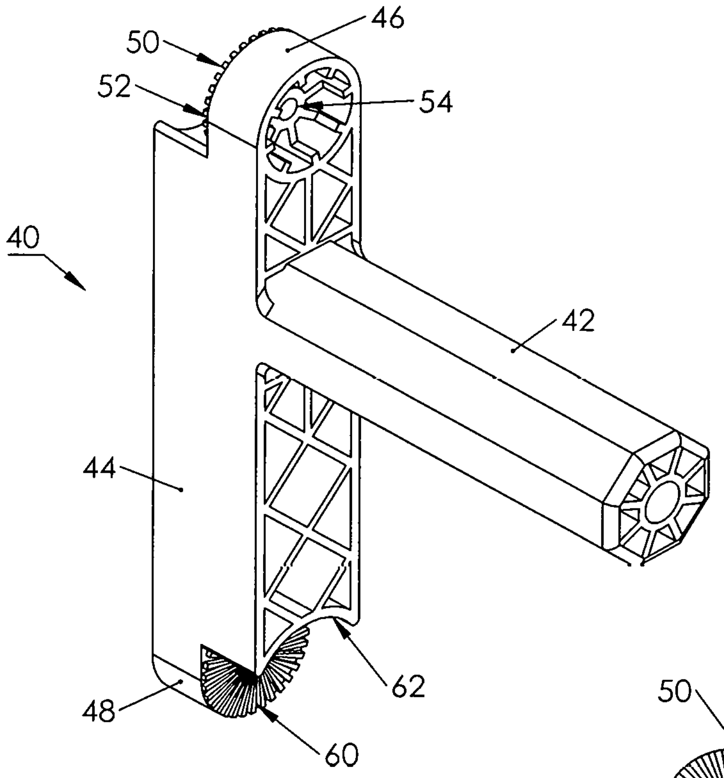
FIG. 9 is a upper perspective of the intermediary section.
Figure 10:
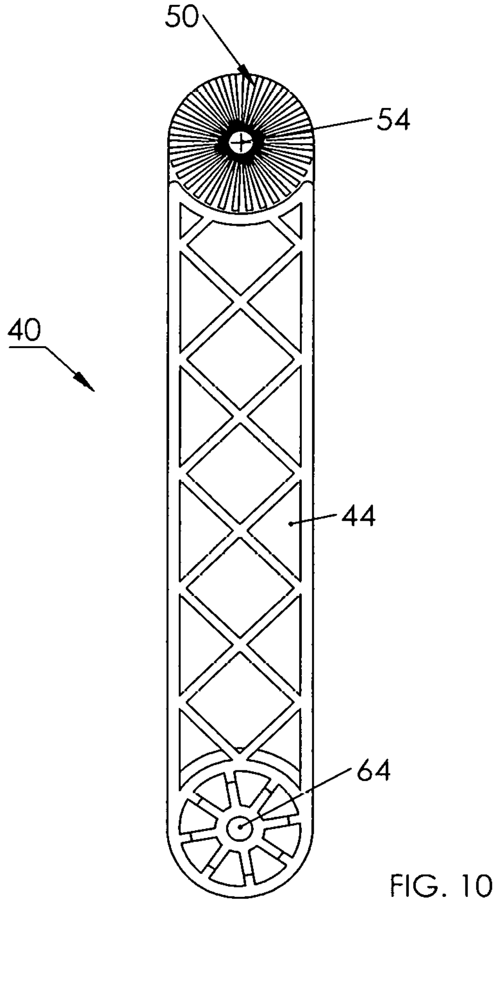
FIG. 10 is an outer side view of the intermediary section.
Figure 11:
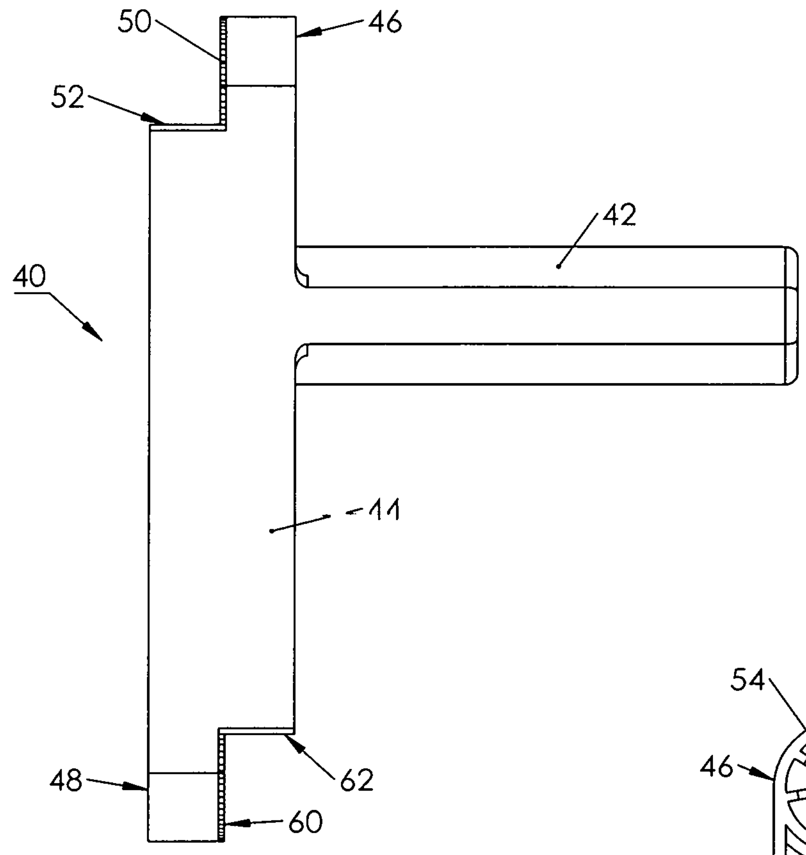
FIG. 11 is a side view of the intermediary section.
Figure 12:
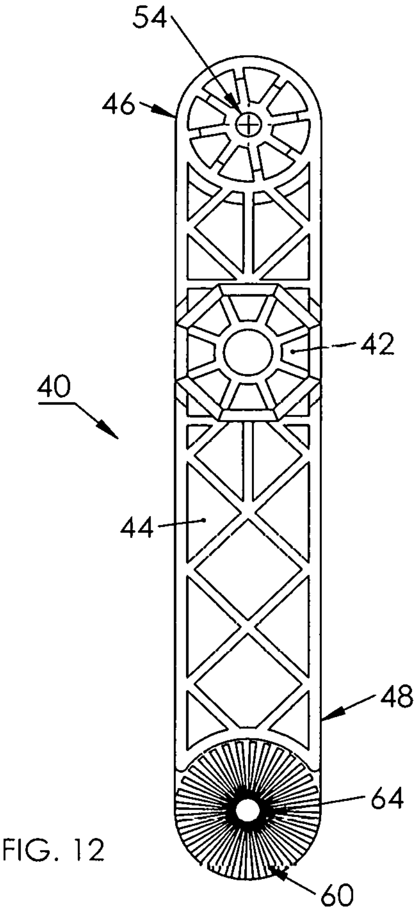
FIG. 12 is an inner side view of the intermediary section.
Figure 13:
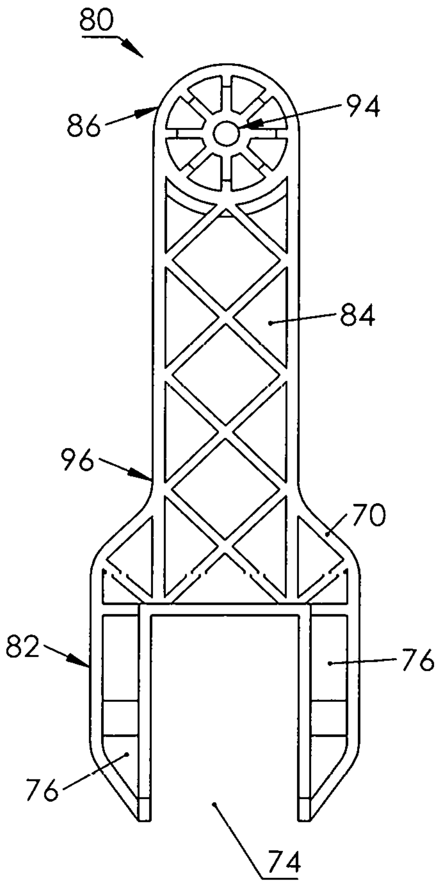
FIG. 13 is an outer side view of the lower section.
Figure 14:
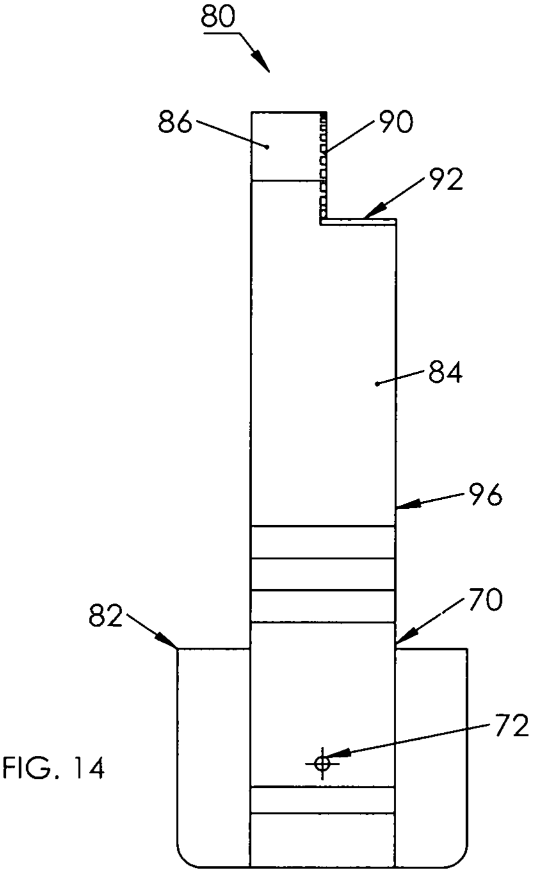
FIG. 14 is a front view of the lower section.
Figure 15:
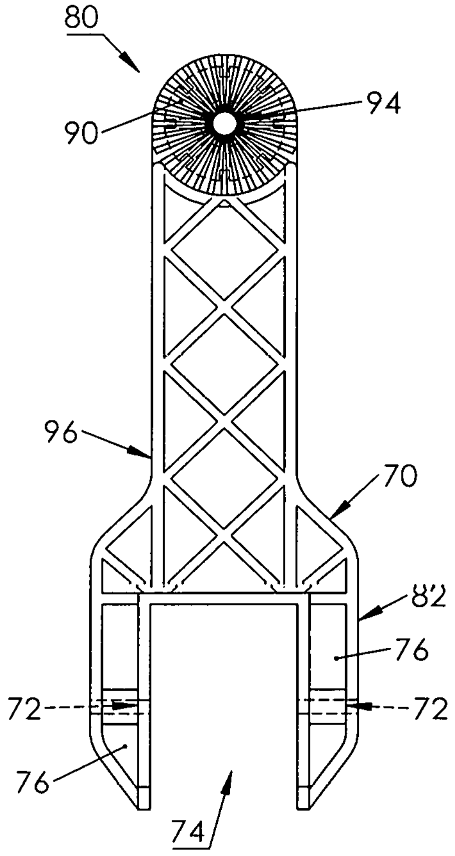
FIG. 15 is an inner side view of the lower section.
Figure 16:
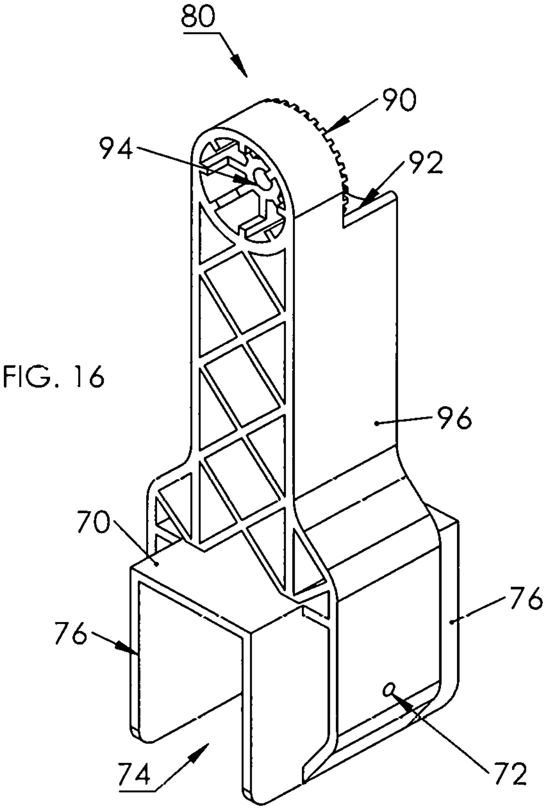
FIG. 16 is an outer perspective view of the lower section.

A pair of adjustable concrete screed extension handles 10, FIGS. 1-16, attaching to a common screed endpiece 100 provide each screed extension handle 10 as a mirror image of the other, with at least two articulating joints 35, 45 to adjust angles between an upper section 20, intermediary section 40 and a lower section 80, the upper section 20 defining an inward directed arm 20 plate extension 22, the intermediary section 40 defining an inward directed grip handle 42 and the lower section 80 defining a lower screed endpiece receiver 82 attaching to the common screed endpiece 100. The endpiece 100 is typically a 2×4 section of lumber of a chosen length which is held within the lower screed endpiece receiver 82 by a pin 105. FIG. 1.

Between each section is the joint 35, 45, which provides the respective sections with the ability to pivot at an angle relative to the two connected sections. This angle may be adjusted by an angle adjusting means 37, 47, best shown in an embodiment illustrated in FIG. 5. A bolt with a nut and a pair of washers allow for the loosening and tightening of the respective joint 35, 45, for movement and retained position. It is recommended that the angle adjustment is at least between 30 and 90 degrees from a straight alignment in either direction. In addition, each joint 35, 45, is provided with a locking face 30, 50, 60, 90, which integrates with each section to retain a fixed angle once the adjustments are locked into place. These opposing locking faces are shown in FIGS. 5, 6, 8-12 and 15-16, and are embodied as having radial ridges which interlock with one another to create a secure and stable joint. Other interlocking means may be used as opposed to those shown.

The upper section 20, FIGS. 1-8, further defines the arm extension plate 22 as a upwardly curved support extending inward from an upper section support member 24 at an upper end 26 and the inner locking face 30 at a lower end 28 with a locking bore 32 through a center of the inner locking face 30. A pivotal channel 34 is defined adjacent to the inner locking face 30 to receive an upper end 46 of the intermediary section 40.

The intermediary section 40, FIGS. 1-5 and 9-12, further defines the upper end 46 having an upper locking face 50 with a locking bore 54 engaging the locking face 30 of the upper section 20 and held together in a fixed position by an angle adjusting means 37. An upper pivotal channel 52 is also defined in the upper end 46. The inward directed grip handle 42 extends from an intermediary section support member 44, further providing a lower end 48 defining a lower locking face 60 including a locking bore 64 and a pivotal channel 62 to receive an upper end 86 of the lower section 80.

The lower section 80, FIGS. 1-5 and 13-16, further defines lower section support member 84 forming an upper end 86 including an inner locking face 90 with a locking bore 94 and defining an upper pivotal channel 92 which receives the lower end 48 and engages the inner locking face 60 of the intermediary section 40, attaching with another angle adjusting means 47. A lower end 96 of the lower section support member 84 defines a screed endpiece receiver 70 with an aligned crossbore 72 through a transverse endpiece channel 74 engaging opposing depending parallel endpiece extensions 76, FIGS. 1 and 15-16. A pin 105, nail or bolt may be used to retain the endpiece 100 within the endpiece channel 74 through each depending endpiece plate 76.

The purpose of the respective adjustable means 37, 47, and respective sections is to provide the paired screed extension handles 100 attached to the common endpiece 100 at a preferred angle dependent upon the working posture of the user. The adjusted angle of the upper section 20 and the intermediary section 40 is that which provides a proper angle between the upper arm, the wrist and the palm grip of each hand as determined during use of the screed extension handle 10. Additionally, the angle between the intermediary section 40 and the lower section 80 is adjusted for a proper angle of the endpiece 100 and the surface being worked, the height of the user and even the surface material being worked by the use, including wet concrete, gravel, masonry substrate for laying stones or pavers, or even soil in landscape projected, in place of the user having to bend over and use hand trowels or other substrate moving and surfacing tools.

It is preferred that each upper section 20, intermediary section 40 and lower section 80 be provided in several supplied lengths to provide the paired screed extension handles 10 for users of all sizes, tall or short, and suited for the strength variance of each user so that user with great or little upper body strengths would find use for these screed extension handles, including those with disabilities of restricted movements.

Materials used for the construction of the screed extension handles would be polycarbonate plastics, light-weight metals and other materials that are structurally solid yet not so heavy that the intended use is restricted to persons with average upper body strength or under certain labor restrictions. It should also be corrosion resistant, since working with concrete materials exposes the product to repeated contact with acidic and basic chemicals including lime, calcium carbonate and gypsum products. These would be determined at the time of manufacture and based upon sound material construction principles. Although shown in the drawings as linear components, the upper section 20, intermediary section 40 and lower section 80 may be provided with slight curvature or non-linear configurations as determined also at the time of manufacture. Width and depth of each component may also vary dependent upon the desire of the engineer charged with the contraction and manufacture of the product.

While the screed extension handles 10 have been particularly shown and described with reference to a preferred embodiment thereof, it will be understood by those skilled in the art that changes in form and detail may be made therein without departing from the spirit and scope of the invention.

What is claimed is:

What is claimed is:

1. A pair of adjustable screed handles for use in leveling and spreading composite materials, each said adjustable screed handle comprising:

an upper section defining an inward directed arm plate extension;

an intermediary section pivotally engaging said upper section and defining an inward directed grip handle;

a lower section pivotally engaging said intermediary section and defining a lower screed endpiece receiver;

an upper interlocking joint between said upper and intermediary section securing said upper section and intermediary section at a desired angle by a first angle adjusting means and a lower interlocking joint between said intermediary and lower section securing said lower section and intermediary section at a desired angle by a second angle adjusting means;

a common endpiece secured within said lower end piece receiver independently connecting each said adjustable screed handle to said common endpiece by a pin, wherein a user may adjust each said adjustable screed handle to a desired position for use in leveling concrete or other substrate materials in a construction or landscape project from a desired standing position, wherein each said adjustable screed handle is a mirror image of the other.

2. The pair of adjustable screed handles of claim 1, each said upper section further comprising;

an upper section support member defining an upper end and a lower end, said lower end defining a locking face with a central locking bore and a pivotal channel adapted to receive an upper end of said intermediary section and allowing said intermediary section to pivot within said pivotal channel at a selected range of angles.

3. The pair of adjustable screed handles of claim 1, each said intermediary section further comprising:

an intermediary section support member defining an upper end having an upper locking face with a central bore and an upper pivotal channel receiving a lower end of said upper section, and a lower end defining a lower locking face with a central locking bore and a lower pivotal channel receiving an upper end of said lower section, wherein said locking face of said upper section interlocks with said upper locking face of said intermediary section, held together by said first angle adjusting means in a fixed position and said lower locking face at said lower end of said intermediary section interlocks with said locking face of said lower section, held together by said second angle adjusting means.

4. The pair of adjustable screed handles of claim 1, each lower section further comprising:

a lower section support member defining an upper end having an upper locking face with a central bore and an upper pivotal channel receiving a lower end of said intermediary section, and a lower end defining said lower screed endpiece receiver, wherein a locking face of a lower end of said intermediary section interlocks with said locking face of said upper end of said lower section, held together by said second angle adjusting means in a fixed position; and said lower screed endpiece receiver further defining a pair of depending endpeice plates forming a transverse endpiece channel independently receiving said common endpiece and securing said endpiece through an aligned crossbore though each said depending endpiece plate with a pin, said endpiece commonly defined as a piece of lumber or dimensional element of a selected length as chosen by said user for a particular screed work project.

* * * * *